United States Patent Office 3,734,888
Patented May 22, 1973

---

3,734,888
POLYKETALS OF AROMATIC POLYKETONES
Roland Darms, Therwil, Switzerland, assignor to E. I.
du Pont de Nemours and Company, Wilmington, Del.
No Drawing. Filed Oct. 7, 1971, Ser. No. 187,509
Int. Cl. C08g 23/20
U.S. Cl. 260—47 R          6 Claims

ABSTRACT OF THE DISCLOSURE

Polyketals based on aromatic polyketones and 1,2- or 1,3-glycols and a process for their preparation. The ketals are extrudable and solvent soluble, and are easily hydrolyzed to the original polyketone and glycol.

BACKGROUND OF THE INVENTION

Polyketone compositions recently discovered, such as those described in U.S. Pat. 3,441,538, because of their unusual high temperature and insulating properties, are well adapted for use in electrical insulating applications. However, one problem encountered in the use of these materials is that of forming shaped articles of the high melting polyketones. For example, polyketone consisting primarily or exclusively of diphenyl ether and terephthoyl chloride generally have melting points in excess of 400° C. Accordingly, at the temperatures required for extrusion, the polymers are subject to thermal degradation, and special construction materials are needed for the extrusion die and other parts of the extruder, so as to prevent warping, corrosion, and oxidation.

Despite considerable effort directed toward the preparation of shaped polyketone articles, a completely satisfactory solution to the problem of extruding the polymers has heretofore not been available.

SUMMARY OF THE INVENTION

The present invention provides novel polyketal compositions and a process for their preparation. These compounds are useful per se for insulating applications and the like, and additionally provide an intermediate for making extruded shaped polyketone articles unobtainable in some cases by extruding polyketone directly.

Specifically, the instant invention provides poly(aromatic ketals) consisting essentially of at least one of the following structural units:

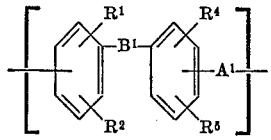

(1)

where $A^1$ is selected from the group consisting of

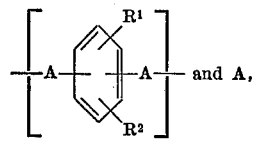 and A, wherein A is selected from the group consisting of

and

$R^1$, $R^2$, $R^4$ and $R^5$ can be the same or different and each is selected from hydrogen; alkyl of 1 through 4 carbons; alkoxy of 1 through 4 carbons; halogen including chlorine, bromine and fluorine; hydroxy; phenyl substituted with 1 or 2 electronegative radicals and phenoxy substituted with 1 or 2 electronegative radicals wherein the electronegative radical is nitro, nitroso, cyano, fluoro or trifluoromethyl; R is independently selected from hydrogen and lower alkyl of 1 to 3 carbon atoms; and $n$ is 2 or 3; and wherein the

moieties comprise at least about 20% of the total A units in the polymer chain; and $B^1$ is selected from a covalent bond,

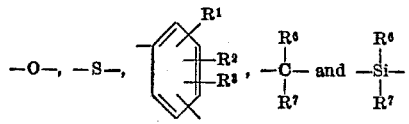

where $R^1$ and $R^2$ have the same meaning as above; and $R^3$ is selected from nitro, nitroso, cyano, fluoro and trifluoromethyl; where $R^6$ and $R^7$ can be the same or different and each is selected from hydrogen, alkyl of 1 to 4 carbons, trifluoromethyl and

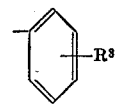

where $R^3$ has the same meaning as above;

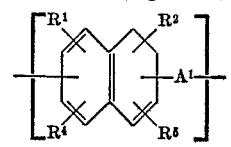

(2)

where $A^1$, $R^1$, $R^2$, $R^4$ and $R^5$ have the same meaning as above;

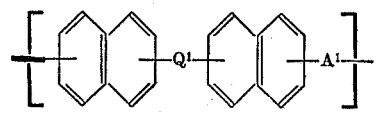

(3)

where $Q^1$ is selected from a covalent bond, —O— and —S—; and $A^1$ has the same meaning as above; and

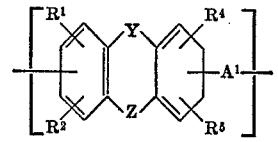

(4)

where $A^1$, $R^1$, $R^2$, $R^4$ and $R^5$ have the same meaning as above; and Y and Z can be the same or different and each is selected from a covalent bond, —O—, —S—, and —CH$_2$—.

There is also provided a process for the preparation of the above ketals, comprising bringing into contact, in the presence of an acid catalyst, an aromatic polyketone and an excess of diol having the structural formula:

$$HO-(CR_2)_n-OH$$

wherein each R is independently selected from H and lower alkyl of 1 to 3 carbon atoms, and $n$ is 2 or 3.

The invention further provides a process for preparing shaped polyketone articles comprising the steps of (1) bringing into contact an aromatic polyketone and a 1,2- or 1,3-glycol in the presence of an acid catalyst until at least about 20% of the carbonyl groups are converted to the corresponding ketal groups, (2) isolating the resulting polyketal, (3) extruding the polyketal into a shaped article at an elevated temperature, and (4) bringing the shaped polyketal into contact with water and acid catalyst to hydrolyze to the corresponding polyketone.

DETAILED DESCRIPTION OF THE INVENTION

Polyketones which can be used in the preparation of polyketals of the present invention include those described in Marks, U.S. Pat. 3,441,538, which patent is hereby incorporated by reference.

Certain of those polyketones have been found to exhibit a particularly wide utility, and are accordingly preferred for use in the instant invention. These preferred starting materials have the recurring structural unit:

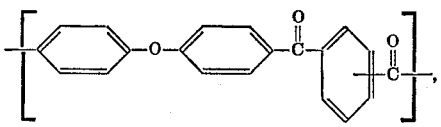

wherein the

moiety is selected from

and

and mixtures thereof.

In making the polyketal, an excess of a diol as specified above should generally be used, and preferably a tenfold molar excess or greater of the diol is employed. The reaction can be carried out in an inert organic solvent including, for example, benzene, toluene, xylene, octane, and decalin. An acid catalyst is used to promote the ketalization reaction. Representative acids which can be used include para-toluenesulfonic acid, methanesulfonic acid, and sulfuric acid. In general, the acid catalyst should be present in amounts to provide about from 0.01 to 0.5 mole of acid per mole of carbonyl group in the ketone.

Elevated temperatures are used to accelerate the rate of reaction, and the reaction is conveniently run at the reflux temperautre of the organic solvent, so as to azeotrope the water produced in the ketalization reaction out of the reaction system. When water is effectively removed in this manner, the reaction can be carried to higher degrees of conversion to ketal. In the ketalization, the mass effects of the water may be more important than the quantity of catalyst used, since an azeotropic reaction medium in the ketal formation prevents the reaction from reversing to hydrolysis of the ketal by effectively removing water formed during the reaction.

The solvent and reaction temperature should be chosen as to have the polyketone in solution during the ketalization reaction. When it is desired to stop the reaction, the reaction mixture is combined with a base to neutralize all of the acid present, since the reverse reaction, hydrolysis of the ketal, is also acid catalyzed. Bases which can be used for this purpose include sodium hydroxide, potassium hydroxide, and ammonium hydroxide.

The polyketals of this invention have lower fusion points than the polyketones from which they are derived. This is true even for those polyketals in which only the minimum percentage of the ketone groups have been ketalized. The crystalline melting point may be lowered in this invention by as much as 150° C. Surprisingly, the effect of ketalization on the glass transition temperature of the polymer is very slight. This is advantageous because the desirable electrical properties of the polymer, which correlate with the glass transition temperature, are affected only to a very small degree.

The lower fusion point of the polyketals of the instant invention permits the use of lower temperatures for extrusion. For those polyketones having melting points sufficiently high to require potential extrusion temperatures of 350 to 400° C. or more, temperatures at which degradation or decomposition of the polymer would become significant, the reduction in melting point for the corresponding polyketal permits extrusion at a temperature where degradation or decomposition does not occur.

The polyketals of this invention have good physical and electrical properties per se. In film form they are clear, colorless, tough and creasable. In either film or powder form they are useful as adhesives in thermally bonding metals and plastics, as they adhere strongly when melt pressed to such materials.

The polyketals of this invention are soluble in various solvents such as N,N-dimethylacetamide, and solutions of the polyketals in such solvent are useful as coating lacquers for metal conductors in wire or sheet form, and for various plastic films, such as polyimides and polyesters. These solutions are also useful as adhesives.

The polyketals of this invention can be converted back to the polyketone from which they are derived. This can be done by hydrolysis as, for example, by immersing the polyketal in water containing a trace of an acid catalyst such as hydrochloric acid, sulfuric acid, acetic acid, and paratoluenesulfonic acid. The hydrolysis is accelerated by heating, for example, by boiling the aqueous solution. The hydrolysis can also be accomplished by suspending the polyketal to be hydrolyzed in the vapor above an acidified boiling aqueous solution, in which case the vapor contains a small amount of the acid catalyst.

The polyketals of the present invention thus provide a means for the preparation of shaped polyketone articles by first preparing the polyketal, shaping the polyketal, and reconverting back to the polyketone, in the event that physical properties are desired that are unique to the polyketone.

The invention is further illustrated by the following specific examples.

EXAMPLE 1

A polyketal was made from a polyketone which is the reaction product of substantially equimolar quantities of diphenyl ether and a 70/30 mixture of terephthalic acid and isophthalic acid. One gram (3.3 millimoles) of the polyketone in powder form, 4.34 grams (70 millimoles) of ethylene glycol and 0.5 gram (2.9 millimoles) of p-toluenesulfonic acid were combined with 100 milliliters of benzene and stirred with refluxing under nitrogen for 2½ days. Water was removed continuously from the reaction mixture by means of a Dean-Stark moisture trap. The reaction mixture was then poured into methanol containing 5% NaOH and 10% water, and a white precipitate formed. The precipitate was washed with water and methanol and dried in a vacuum oven. The resulting product, in the form of a white powder, was identified as a polyketal having the following recurring structural unit:

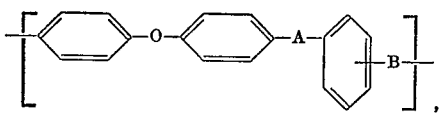

wherein about 70% of the

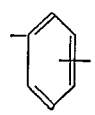

moieties are

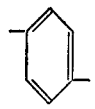

and about 30% are

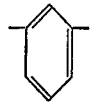

and wherein A and B are independently selected from

and

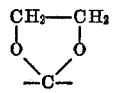

Infrared analysis indicated that the

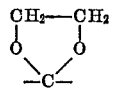

moieties comprise at least about 20% of the total of A and B. The inherent viscosity of the product was 0.65 as measured on a 0.5% by weight solution in concentrated sulfuric acid at room temperature.

The polymer was found to be soluble in dimethylacetamide, had a glass transition temperature of 159° C. and a crystalline melting point of 230° C. By comparison, the starting polyketone had a glass transition temperature of 167° C. and a crystalline melting point of 330° C.

The polyketone was melt pressed at 240° C. into clear and creasable films.

A melt pressed film of the polyketal was heated in aqueous 6 molar HCl on a steam bath for 2½ hours, washed with water and dried. The film was then subjected to infrared analysis, which indicated partial reconversion to the polyketone. The sample was then exposed to the vapor of boiling water containing a small amount of HCl for 16 hours. The film was again analyzed by infrared techniques, which indicated almost complete reconversion to the starting polyketone.

EXAMPLE 2

The procedure of Example 1 was repeated, except that the reaction mixture was refluxed for only 24 hours. The infrared spectrum of the resulting white polymer showed that a smaller amount of ketal groups was present than in the polyketal of Example 1, but still comprising greater than about 20% of the total of A and B. The polymer softened at 250° and formed a clear melt at 275°. It was soluble in dimethylacetamide. A clear and tough film was pressed at 250° which showed the following electrical properties:

| Temp. (° C.) | 23 | 105 | 155 | 200 |
|---|---|---|---|---|
| Frequency | $10^2$–$10^5$ | $10^2$–$10^5$ | $10^2$–$10^5$ | $10^2$–$10^5$ |
| Dielectric constant | 3.55–3.51 | 3.45–3.38 | 3.41–3.33 | 5.26–3.84 |
| Dissipation factor | 0.00357–0.00433 | 0.00497–0.00252 | 0.00469–0.00359 | 0.01785–0.07315 |
| Volume resistivity | $2.6 \times 10^{16}$ | $3.8 \times 10^{15}$ | $8.3 \times 10^{14}$ | $9.7 \times 10^{11}$ |

The properties up to 155° equal the electrical properties of similar polyketones. The polyketal was found to adhere firmly to aluminum. The lap seal strength of a sample melt pressed between two small aluminum strips at 250° was 54 lbs./in.

EXAMPLE 3

A polyketone was prepared from diphenyl ether and terephthalic acid, and 1 gram of this polyketone (3.3 millimoles), 4.3 grams (70 millimoles) of ethylene glycol and 0.5 gram (2.9 millimoles) of p-toluenesulfonic acid were combined with 100 milliliters of benzene. The resulting mixture was refluxed for a period of 40 hours and the resulting polyketal isolated using the same conditions and techniques as in Example 1, and was found to have an inherent viscosity of 1.01. The product was identified as having the following recurring structural unit:

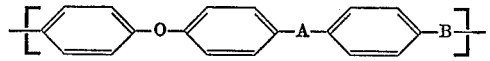

wherein A and B are independently selected from

and

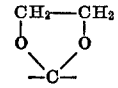

The polymer was analyzed by infrared techniques, which indicated that

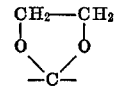

moieties comprised at least about 20% of the total of A and B. The polyketal had a melting point of 315° C. Clear, tough films were melt pressed from the polymer at 325° C.

EXAMPLE 4

The procedure of Example 1 was repeated, except that the polyketone was prepared from an 80/20 mixture of terephthalic and isophthalic acids, and 2.05 grams (32 millimoles) of ethylene glycol and 0.3 gram (1.7 millimoles) of p-toluenesulfonic acid were used. The resulting white polyketal exhibited a melting point of 235° C. The polymer was melt extruded on a melt indexer at 262° C. and a pressure of 8.4 kilograms after preheating at 240° C. for 15 minutes as well as 262° C. for 15 minutes. The extrudate was melt pressed to a clear, colorless, tough and creasable film. By comparison, the starting polyketone exhibited a crystalline melting point of 380° C. and is extrudable only at or above 390° C.

EXAMPLE 5

The procedure of Example 4 was repeated, except that 2.88 grams (32 millimoles) of 2,3-butanediol was used instead of the ethylene glycol. Two grams (6.6 millimoles) of the polyketone, and 0.1 gram (0.6 millimole) of the p-toluenesulfonic acid were used instead of the materials and the quantities of Example 4. The mixture was reacted for a period of one week and the resulting polymer isolated by pouring the reaction mixture into methanol containing 10% water and 5% potassium hydroxide. The precipitate was filtered and washed with neutral water. The resulting tan powder had a melting point above 300° C. and a melt index of 135 at 375° C. after 5 minutes of aging at 375° C. and a pressure of 8.4 kilograms.

EXAMPLE 6

The procedure of Example 5 was repeated except that 5 grams (16.5 millimoles) of the polyketone, 30 grams (330 millimoles) of the 2,3-butanediol and 0.5 gram (2.9 millimoles) of the p-toluene sulfonic acid were used instead of the quantities specified in Example 5. The mixture was reacted for a period of 20 hours under reflux, the resulting polymer isolated and vacuum dried at a temperature of 100° C. The resulting product is identified as having the following recurring structural unit:

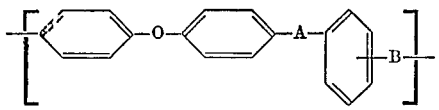

wherein about 80% of the

moieties are

and about 20% are

and wherein A and B are independently selected from

and

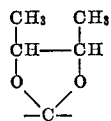

The product was subjected to infrared analysis and the

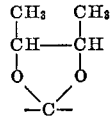

moieties were found to comprise at least 20% of the total of A and B units. The polymer exhibited a melt index of 80 at 375° C. after aging for 5 minutes at 375° C. using 8.4 kilograms of pressure. When the polymer was aged for 15, 30 and 45 minutes, the melt indices, respectively, were 33, 11, and 3.9.

The polymer was melt pressed at a temperature of 350° C. to give a tough, light tan, creasable film.

EXAMPLE 7

The procedure of Example 6 was repeated, except that 25 grams (330 millimoles) of 1,3-propanediol was used instead of the butanediol in Example 6. The reaction mixture was refluxed for a period of 20 hours and the resulting polymer product isolated. The product was identified as having the following recurring structural unit:

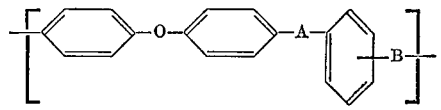

wherein about 80% of the

moieties are

and about 20% are

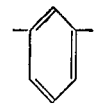

and wherein A and B are independently selected from

and

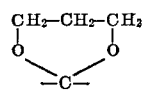

The polymer was analyzed by infrared techniques and the

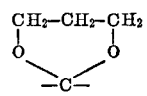

moieties are found to comprise at least about 20% of the total of A and B. The product was found to exhibit a melt index of 4 at 375° C., after 5 minutes aging at 375° C. and 8.4 kilograms of pressure.

I claim:
1. Film-forming poly(aromatic ketals) consisting essentially of at least one of the following structural units:

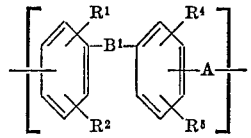

(1)

where $A^1$ is selected from the group consisting of

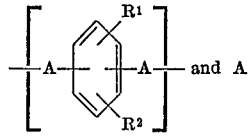

and A.

A is selected from the group consisting of

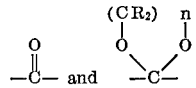

$R^1$, $R^2$, $R^4$ and $R^5$ can be the same or different and each is within selected from hydrogen; alkyl of 1 through 4 carbons; alkoxy of 1 through 4 carbons; halogen including chlorine, bromine and fluorine; hydroxy; phenyl substituted with 1 or 2 electronegative radicals and phenoxy substituted with 1 or 2 electronegative radicals wherein the electronegative radical is nitro, nitroso, cyano, fluoro or trifluoromethyl; R is independently selected from hydrogen and lower alkyl of 1 to 3 carbon atoms; and n is 2 or 3; and wherein the

moieties comprise at least about 20% of the total A units in the polymer chain; and $B^1$ is selected from a covalent bond,

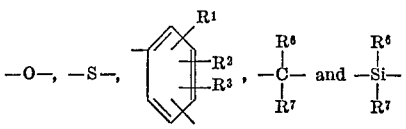

where $R^1$ and $R^2$ have the same meaning as above; and $R^3$ is selected from nitro, nitroso, cyano, fluoro and trifluoromethyl; where $R^6$ and $R^7$ can be the same or different and each is selected from hydrogen, alkyl of 1 to 4 carbons, trifluoromethyl and

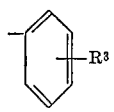

where R³ has the same meaning as above;

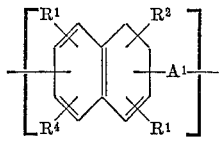     (2)

where A¹, R¹, R², R⁴ and R⁵ have the same meaning as above;

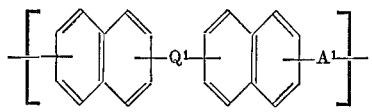     (3)

where Q¹ is selected from a covalent bond, —O— and —S—; and A¹ has the same meaning as above; and

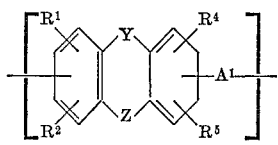     (4)

where A¹, R¹, R², R⁴ and R⁵ have the same meaning as above; and Y and Z can be the same or different and each is selected from a covalent bond, —O—, —S—, and —CH₂—.

2. A polymer of claim 1 wherein R is hydrogen.
3. A polymer of claim 1 wherein $n$ is 2.
4. A polymer of claim 1 consisting essentially of the recurring structural unit (1) and wherein R¹, R², R⁴ and R⁵ are all hydrogen, and B¹ is —O—.
5. A polymer of claim 4 wherein R is hydrogen and $n$ is 2.
6. A process for the preparation of shaped polyketone articles from poly(aromatic ketals comprising bringing into contact, in the presence of an acid catalyst
(a) an aromatic polyketone consisting essentially of at least one of the following structural units:

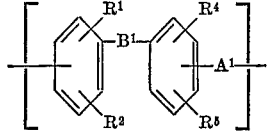     (1)

where A¹ is selected from the group consisting of

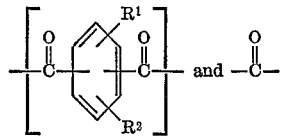

R¹, R², R⁴ and R⁵ can be the same or different and each is selected from hydrogen; alkyl of 1 through 4 carbons; alkoxy of 1 through 4 carbons; halogen including chlorine, bromine and fluorine; hydroxy; phenyl substituted with 1 or 2 electronegative radicals and phenoxy substituted with 1 or 2 electronegative radicals wherein the electronegative radical is nitro, nitroso, cyano, fluoro or trifluoromethyl; and B¹ is sealed from a covalent bond, —O—, —S—,

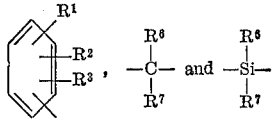

where R¹ and R² have the same meaning as above; and R³ is selected from nitro, nitroso, cyano, fluoro and trifluoromethyl; where R⁶ and R⁷ can be the same or different and each is selected from hydrogen, alkyl of 1 to 4 carbons, trifluoromethyl and

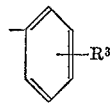

where R³ has the same meaning as above;

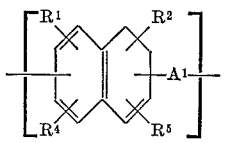     (2)

where A¹, R¹, R², R⁴ and R⁵ have the same meaning as above;

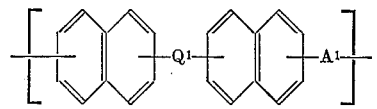     (3)

wherein Q¹ is selected from a covalent bond, —O— and —S—; and A¹ has the same meaning as above; and

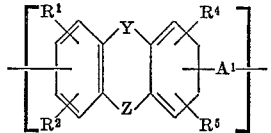     (4)

where A¹, R¹, R², R⁴ and R⁵ have the same meaning as above; and Y and Z can be the same or different and each is selected from a covalent bond, —O—, —S—, and —CH₂—; and
(b) an excess of diol having the structural formula:

HO—(CR₂)ₙ—OH wherein each R is independently selected from H and lower alkyl of 1 to 3 carbon atoms, and $n$ is 2 or 3; isolating the resulting poly(aromatic ketal), extruding the poly(aromatic ketal) into a shaped article at an elevated temperature, and bringing the shaped poly(aromatic ketal) into contact with water and acid catalyst to hydrolyze to the corresponding polyketone.

References Cited
UNITED STATES PATENTS 3,065,205   11/1962   Bonner.
3,385,825   5/1968   Goodman et al.
3,441,538   4/1969   Marks.

OTHER REFERENCES

Sulzbacher et al., J. Am. Chem. Soc. 70, 2827 (1948).

MELVIN GOLDSTEIN, Primary Examiner

U.S. Cl. X.R.

260—61, 63 R, 78.4 R